United States Patent
Gopal et al.

(10) Patent No.: US 12,177,931 B2
(45) Date of Patent: Dec. 24, 2024

(54) DUAL SUBSCRIBER COEXISTENCE MANAGEMENT

(71) Applicant: QUALCOMM Incorporated, San Diego, CA (US)

(72) Inventors: Thawatt Gopal, San Diego, CA (US); Cheol Hee Park, San Diego, CA (US); Qingxin Chen, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 17/447,399

(22) Filed: Sep. 10, 2021

(65) Prior Publication Data

US 2023/0078016 A1   Mar. 16, 2023

(51) Int. Cl.
*H04W 8/18* (2009.01)
*H04W 24/06* (2009.01)
*H04W 24/08* (2009.01)
H04W 60/00 (2009.01)
H04W 72/541 (2023.01)

(52) U.S. Cl.
CPC .......... *H04W 8/183* (2013.01); *H04W 24/06* (2013.01); *H04W 24/08* (2013.01); *H04W 60/005* (2013.01); *H04W 72/541* (2023.01)

(58) Field of Classification Search
CPC ... H04W 24/06; H04W 24/08; H04W 60/005; H04W 72/02; H04W 72/541; H04W 72/542; H04W 72/56; H04W 8/183; H04W 8/22; H04W 72/569
See application file for complete search history.

(56) References Cited

U.S. PATENT DOCUMENTS 8,526,946 B2   9/2013   Pattaswamy et al.
9,137,687 B2   9/2015   Gottimukkala et al.
(Continued)

FOREIGN PATENT DOCUMENTS

CN   110692263 A        1/2020
CN   113423106 A   *   9/2021   ........ H04W 72/1273
(Continued)

OTHER PUBLICATIONS

Jung et al., "Performance improvements of Universal Mobile Telecommunications System enhanced uplink using mitigation scheme in single Tx and dual Rx dual-SIM dual-active devices", IET, Electronics Letters Dec. 10, 2015 vol. 51 No. 25 pp. 2160-2162 (Year: 2015).*

(Continued)

*Primary Examiner* — Shah M Rahman
(74) *Attorney, Agent, or Firm* — QUALCOMM Incorporated

(57) ABSTRACT

Various aspects of the present disclosure generally relate to wireless communication. In some aspects, a user equipment (UE) may obtain one or more parameters associated with a dual subscriber operation of the UE that includes communicating using a first subscriber entity and a second subscriber entity. The UE may transmit one or more uplink communications via one or more of the first subscriber entity or the second subscriber entity using a coexistence management configuration that is based at least in part on the one or more parameters. Numerous other aspects are described.

30 Claims, 11 Drawing Sheets

(56) References Cited

U.S. PATENT DOCUMENTS

| | | | |
|---|---|---|---|
| 10,187,781 B2 | 1/2019 | Kumar et al. | |
| 10,980,001 B2 | 4/2021 | Huang et al. | |
| 11,558,733 B2* | 1/2023 | Baskar | H04W 28/12 |
| 2012/0264473 A1* | 10/2012 | Mujtaba | H04W 68/00 |
| | | | 455/515 |
| 2013/0316718 A1 | 11/2013 | Hsu et al. | |
| 2014/0200046 A1* | 7/2014 | Sikri | H04B 17/345 |
| | | | 455/552.1 |
| 2014/0213210 A1 | 7/2014 | Li et al. | |
| 2014/0228039 A1 | 8/2014 | Zhao et al. | |
| 2014/0370892 A1 | 12/2014 | Gottimukkala et al. | |
| 2015/0011236 A1* | 1/2015 | Kazmi | H04W 52/365 |
| | | | 455/456.1 |
| 2015/0071088 A1 | 3/2015 | Gottimukkala et al. | |
| 2015/0295692 A1 | 10/2015 | Gowda et al. | |
| 2015/0304963 A1 | 10/2015 | Mitra et al. | |
| 2015/0381291 A1 | 12/2015 | Mahajan et al. | |
| 2016/0049976 A1 | 2/2016 | Krishnamoorthi et al. | |
| 2016/0099684 A1 | 4/2016 | Qiu et al. | |
| 2016/0134317 A1 | 5/2016 | Hu et al. | |
| 2016/0278128 A1* | 9/2016 | Krishnamurthy | H04B 1/3816 |
| 2016/0330653 A1 | 11/2016 | Yang et al. | |
| 2017/0026876 A1 | 1/2017 | Yang et al. | |
| 2017/0180550 A1 | 6/2017 | Geo et al. | |
| 2017/0208494 A1 | 7/2017 | Moon et al. | |
| 2017/0223313 A1 | 8/2017 | Chong et al. | |
| 2017/0223589 A1* | 8/2017 | Lee | H04W 60/005 |
| 2018/0084601 A1 | 3/2018 | Dhanapal et al. | |
| 2018/0176887 A1 | 6/2018 | Strobl | |
| 2018/0184309 A1 | 6/2018 | Bhardwaj et al. | |
| 2018/0234878 A1* | 8/2018 | Anand | H04W 48/18 |
| 2018/0234916 A1 | 8/2018 | Song et al. | |
| 2018/0242192 A1 | 8/2018 | Zhao et al. | |
| 2018/0270649 A1 | 9/2018 | Tsai et al. | |
| 2018/0338284 A1 | 11/2018 | Maheshwari et al. | |
| 2019/0199413 A1* | 6/2019 | Sundararajan | H04B 7/0695 |
| 2019/0364492 A1* | 11/2019 | Azizi | H04W 24/08 |
| 2020/0336891 A1 | 10/2020 | Guo et al. | |
| 2021/0029773 A1 | 1/2021 | Majumder et al. | |
| 2021/0266058 A1* | 8/2021 | Yu | H04B 7/08 |
| 2021/0400599 A1 | 12/2021 | Gopal | |
| 2022/0007171 A1* | 1/2022 | Wang | H04W 36/302 |
| 2022/0103214 A1* | 3/2022 | Gopal | H04B 7/0623 |
| 2022/0150788 A1 | 5/2022 | Jiang et al. | |
| 2022/0232367 A1 | 7/2022 | Gopal et al. | |
| 2022/0295543 A1 | 9/2022 | Shahidi et al. | |
| 2023/0370833 A1* | 11/2023 | Zhang | H04B 7/0404 |
| 2024/0089918 A1* | 3/2024 | Shrivastava | H04W 48/18 |

FOREIGN PATENT DOCUMENTS

| | | | | |
|---|---|---|---|---|
| EP | 2302973 A1 | 3/2011 | | |
| EP | 2515593 A2 | 10/2012 | | |
| WO | 2015160457 | 10/2015 | | |
| WO | WO-2016122773 A1 | 8/2016 | | |
| WO | WO-2020125839 A1 * | 6/2020 | | G06F 21/31 |
| WO | WO-2020247043 A1 | 12/2020 | | |
| WO | WO-2021253966 A1 * | 12/2021 | | H04W 36/0011 |

OTHER PUBLICATIONS

International Search Report and Written Opinion—PCT/US2022/074466—ISA/EPO—Nov. 18, 2022.

* cited by examiner

DUAL SUBSCRIBER COEXISTENCE MANAGEMENT

FIELD OF THE DISCLOSURE

Aspects of the present disclosure generally relate to wireless communication and to techniques and apparatuses for dual subscriber coexistence management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining one or more parameters associated with a dual subscriber operation of the UE that includes communicating using a first subscriber entity and a second subscriber entity. The method may include transmitting one or more uplink communications via one or more of the first subscriber entity or the second subscriber entity using a coexistence management configuration that is based at least in part on the one or more parameters.

Some aspects described herein relate to a UE for wireless communication. The user equipment may include a memory and one or more processors coupled to the memory. The one or more processors may be configured to obtain one or more parameters associated with a dual subscriber operation of the UE that includes communicating using a first subscriber entity and a second subscriber entity. The one or more processors may be configured to transmit one or more uplink communications via one or more of the first subscriber entity or the second subscriber entity using a coexistence management configuration that is based at least in part on the one or more parameters.

Some aspects described herein relate to a non-transitory computer-readable medium that stores a set of instructions for wireless communication by a UE. The set of instructions, when executed by one or more processors of the UE, may cause the UE to obtain one or more parameters associated with a dual subscriber operation of the UE that includes communicating using a first subscriber entity and a second subscriber entity. The set of instructions, when executed by one or more processors of the UE, may cause the UE to transmit one or more uplink communications via one or more of the first subscriber entity or the second subscriber entity using a coexistence management configuration that is based at least in part on the one or more parameters.

Some aspects described herein relate to an apparatus for wireless communication. The apparatus may include means for obtaining one or more parameters associated with a dual subscriber operation of the apparatus that includes communicating using a first subscriber entity and a second subscriber entity. The apparatus may include means for transmitting one or more uplink communications via one or more of the first subscriber entity or the second subscriber entity using a coexistence management configuration that is based at least in part on the one or more parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
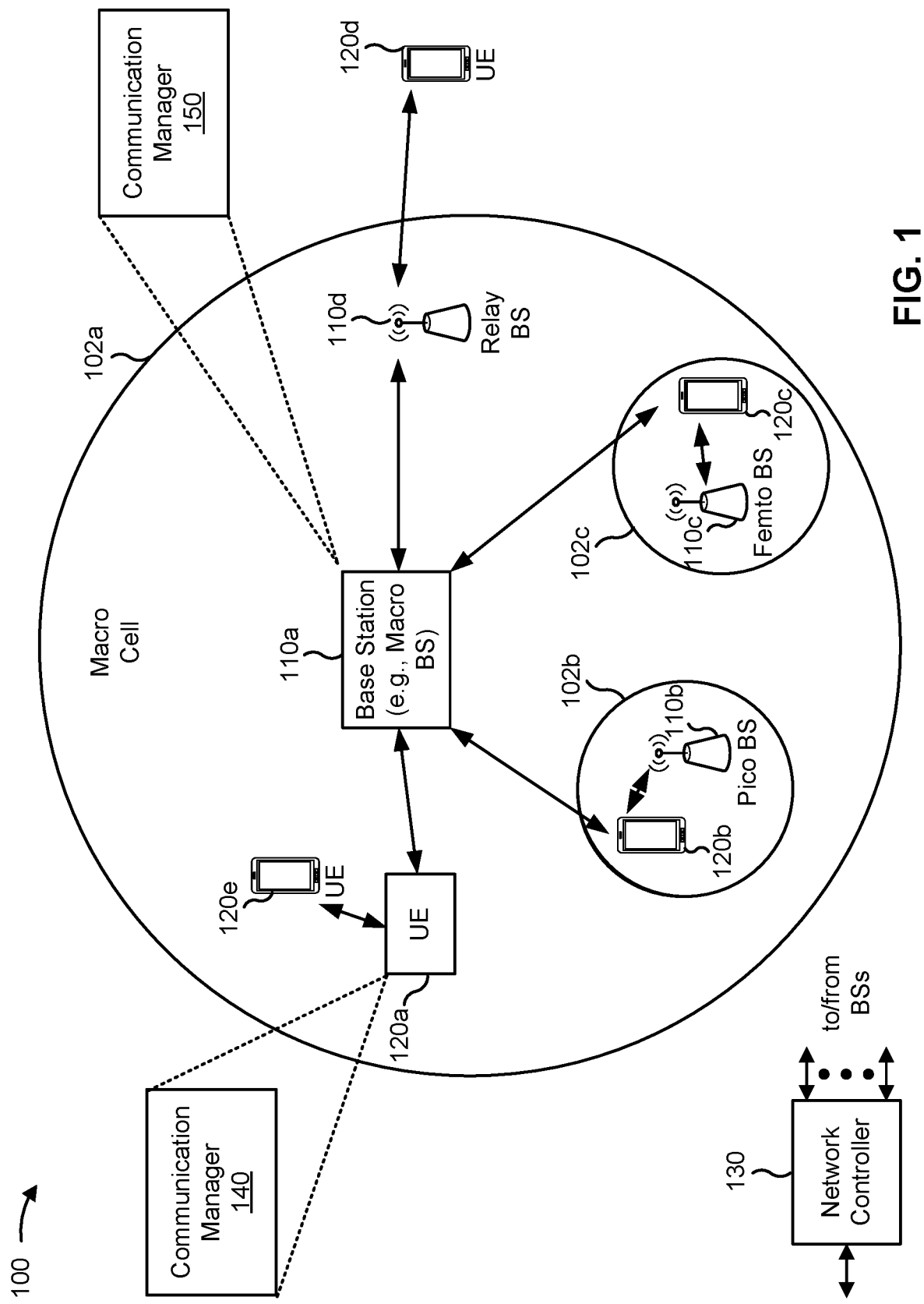
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain one or more parameters associated with a dual subscriber operation of the UE that includes communicating using a first subscriber entity and a second subscriber entity; and transmit one or more uplink communications via one or more of the first subscriber entity or the second subscriber entity using a coexistence management configuration that is based at least in part on the one or more parameters. Additionally, or alternatively, the communication manager 140 may perform one or more other operations described herein.

As indicated above, FIG. 1 is provided as an example. Other examples may differ from what is described with regard to FIG. 1.

Figure 2:
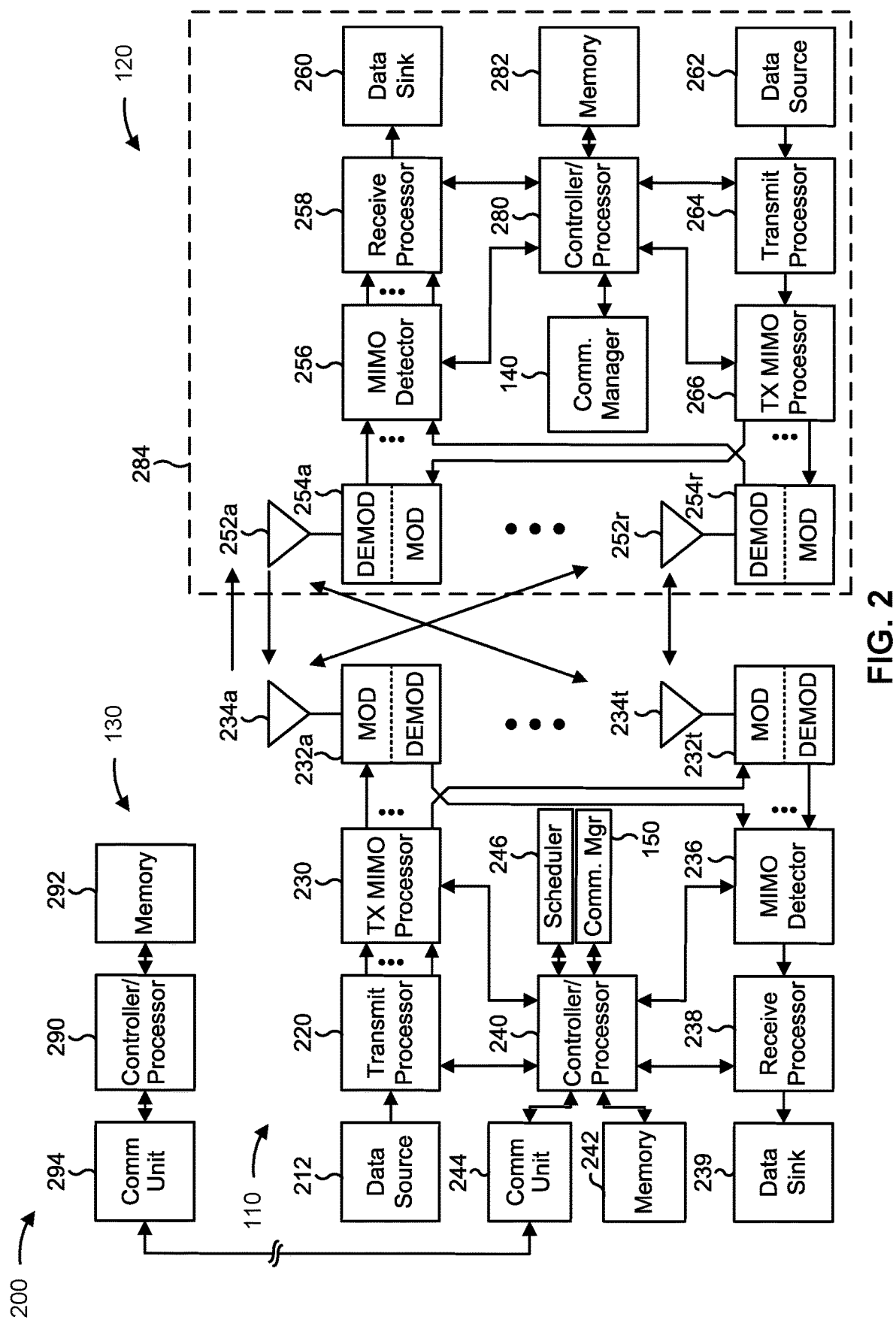
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with dual subscriber coexistence management, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, the UE includes means for obtaining one or more parameters associated with a dual subscriber operation of the UE that includes communicating using a first subscriber entity and a second subscriber entity; and/or means for transmitting one or more uplink communications via one or more of the first subscriber entity or the second subscriber entity using a coexistence management configuration that is based at least in part on the one or more parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
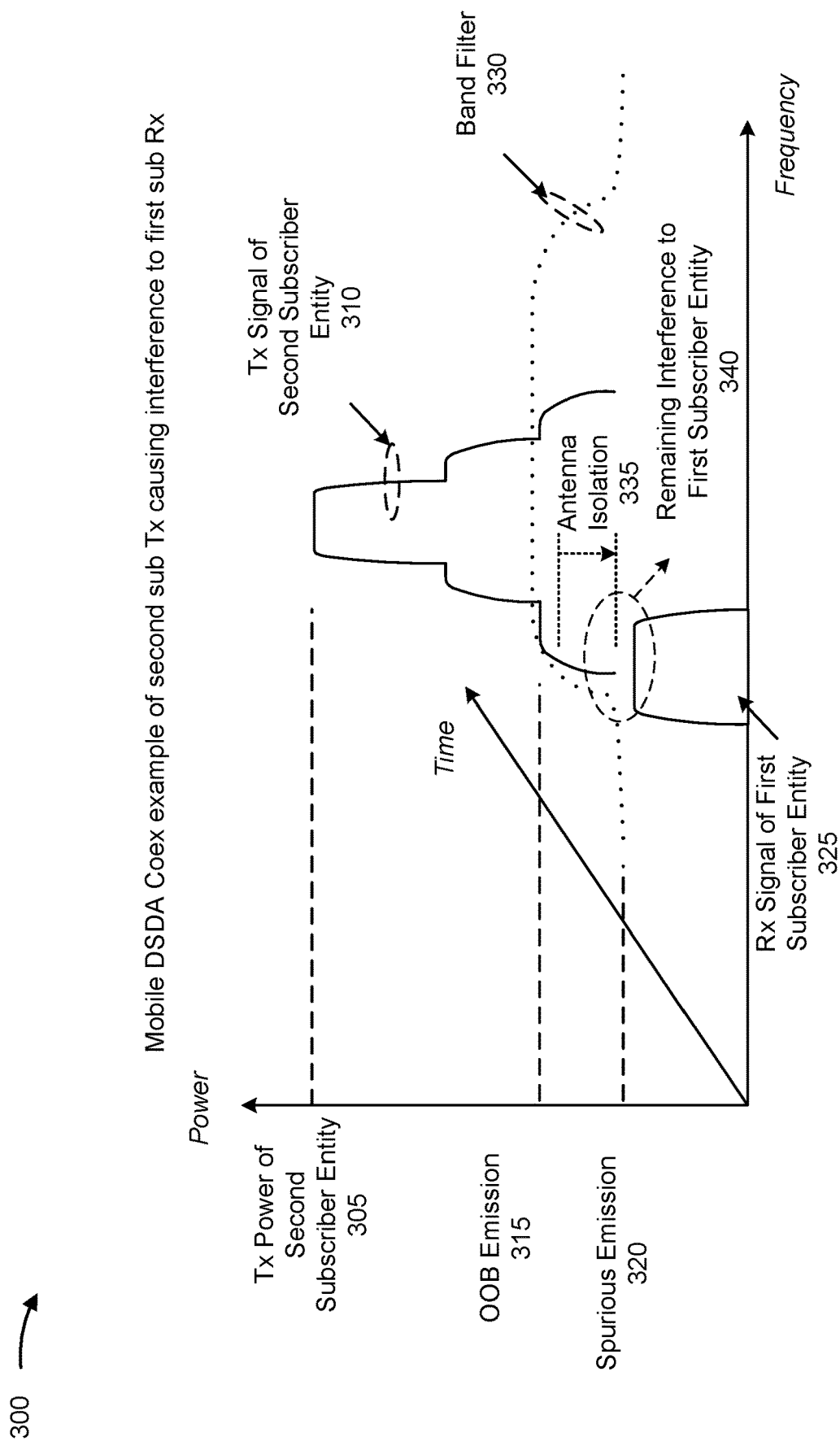
FIG. 3 is a diagram illustrating an example of interference between subscriber entities of a UE, in accordance with the present disclosure.

FIG. 3 is a diagram illustrating an example of interference between subscriber entities of a UE, in accordance with the present disclosure. The UE may include a first subscriber entity in a connected mode and a second subscriber entity in a connected mode. The first subscriber entity and the second subscriber entity may operate in a multi-subscriber identity module (multi-SIM) dual subscriber dual active (DSDA) mode in which both subscriber entities are configured for concurrent activity.

In some DSDA modes, the second subscriber entity may be configured for communication on a frequency band that is a harmonic (e.g., a $2^{nd}$ harmonic or a $3^{rd}$ harmonic) of a frequency band configured for communication of the first subscriber entity. In this case, transmissions via the first subscriber entity may cause interference in a receive band of the second subscriber entity.

In some DSDA modes, intermodulation of transmissions of the first subscriber entity and the second subscriber entity may form intermodulation products of two transmissions, which may cause reception desensing (e.g., sensing degradation) for the first subscriber entity and/or the second subscriber entity.

In some DSDA modes, a transmission power from the first subscriber entity causes blocking to the second subscriber entity, which may cause desensing and/or damage to a low noise amplifier (LNA) if, for example, a power input at the LNA is above a tolerance threshold.

As shown in FIG. 3, the UE may transmit an uplink communication with a transmission (Tx) power 305 of the second subscriber entity. The UE may transmit a transmission signal 310 of the second subscriber entity. Based at least in part on the UE transmitting the transmission signal 310 of the second subscriber entity, the UE may also transmit an out of band (OOB) emission 315 and/or spurious emission 320 that cause interference outside of an allocated bandwidth for the transmission signal 310.

As shown in FIG. 3, the UE may receive a reception signal 325 of the first subscriber entity. The power of the reception signal 325 may be less than a power of the OOB emission 315 and/or the spurious emission 320. This may cause the UE to be unable to receive the reception signal 325. The UE may be configured to perform one or more operations to mitigate the interference from the OOB emission 315 and/or the spurious emission 320. For example, the UE may apply a band filter 330 and/or may perform antenna isolation 335 to reduce received power from the OOB emission 315 and/or the spurious emission 320 at a frequency band of the reception signal 325.

However, the one or more operations may be insufficient and may leave a remaining interference 340 to the first subscriber entity that is unacceptable for the UE to receive the reception signal 325. This may cause communication errors for the UE, which may consume power, network, communication, and/or computing resources to detect and correct.

As indicated above, FIG. 3 is provided as an example. Other examples may differ from what is described with regard to FIG. 3.

In some aspects described herein, a UE may transmit one or more uplink communications via one or more of a first subscriber entity and a second subscriber entity operating in a DSDA operation of the UE. The UE may transmit the one or more communications using a coexistence management configuration that is based at least in part on one or more parameters associated with the DSDA operation.

In some aspects, the UE may determine a coexistence scenario (e.g., harmonic interference, intermodulation of transmissions, and/or blocking, among other examples) based at least in part on RF bands configured for the first subscriber entity and the second subscriber entity. In some aspects, the UE may determine the coexistence scenario via a-priori offline characterization, measurements, and/or simulation in an environment. In some aspects, the UE may determine the coexistence scenario via a simulation model that is based at least in part on typical (e.g., expected) operating conditions of the UE.

In some aspects, the UE may determine the coexistence scenario via real-time monitoring of communication metrics (e.g., signal-to-noise-ratio (SNR), RSSI, RSRP, RSRQ, Rx block error rate (BLER), Tx BLER and/or acknowledgement/non-acknowledgment (ACK/NACK) metrics) during concurrent transmission and reception activities by both subscriber entities in comparison to the communication metrics during periods of no concurrent transmission and reception activities by both subscriber entities. For example, the UE may obtain the communication metrics by measuring the second subscriber entity when the first subscriber entity is inactive (e.g., having no transmissions or receptions) in comparison to the first subscriber entity being active (e.g., having active transmissions and/or receptions). The UE may obtain the communication metrics as a difference in the communication metrics between when the first subscriber entity is active or inactive. For example, the UE may monitor reception metrics for the second subscriber entity when the first subscriber entity is actively transmitting to determine if transmitting via the first subscriber entity degrades reception via the second subscriber entity. Additionally, or alternatively, the UE may monitor reception metrics for degradation when both of the first subscriber entity and the second subscriber entity are actively transmitting and/or monitor reception metrics for degradation when either, but not both, of the first subscriber entity or the second subscriber entity are actively transmitting. In this way, the UE may detect whether degradation occurs only when transmitting via both of the first subscriber entities, when transmitting via the first subscriber entity, or when transmitting via the second subscriber entity.

In some aspects, the UE may manage coexistence in the DSDA operation based at least in part on capabilities of the UE that are associated with coexistence, such as analog RF front-end filters, antenna isolation capabilities, RF front-end paths or connectors coupling, or isolation between RF-bands and/or paths used by the first subscriber entity and the second subscriber entity.

In some aspects, the UE may manage coexistence in the DSDA operation based at least in part on a service priority level of communications associated with the first subscriber entity and the second subscriber entity. For example, a high service priority level subscriber entity activity may be protected from coexistence issues (e.g., degradation and/or damage, among other examples) based at least in part on prioritizing transmitting and/or receiving activities at the expense of lower service priority transmitting and/or receiving activities.

In some aspects, the UE may manage coexistence in the DSDA operation based at least in part on time domain micro-priorities for each subscriber entity for coexistence issue mitigation. For example, a high micro-priority transmitting and/or receiving activities of the first subscriber entity may be protected from coexistence issues based at least in part on prioritizing the transmitting and/or receiving activities of the first subscriber entity at the expense of transmitting and/or receiving activities of the second subscriber entity (e.g., having lower micro-priority).

In some aspects, UE coexistence management may mitigate coexistence issues based at least in part on applying Tx-OFF programming, Tx backoff, and/or LNA protection via Tx backoff, among other examples. The UE may mitigate coexistence issues such as inter-modulation of transmit products of multiple subscriber entities that causes receiver desensing, transmit harmonics from the first subscriber entity causing receiver desensing to the second subscriber entity, and/or transmitting activity of the first subscriber entity causing LNA damage to the second subscriber entity, among other examples.

In this way, the UE in a DSDA operation may apply a coexistence management scheme that allows the UE to use the first subscriber entity and the second subscriber entity concurrently with RF coexistence impairments management that accounts for (e.g., is based at least in part on) service priorities across subscriber entities, micro-priorities across subscriber entities, pre-determined coexistence characterization parameters (e.g., configured in radio-resource control (RRC) signaling and/or in a protocol standard, among other examples), real-time (e.g., dynamically obtained) coexistence monitoring parameters, RF reliability parameters, and/or acceptable RF degradation limits (e.g., limits on necessary power amplifier backoff and how the power amplifier backoff affects performance). Additionally, or alternatively, the first subscriber entity or the second subscriber entity may be prioritized to ensure quality of service (QoS) parameters are maintained for priority services (e.g., for voice calls and/or other live communications) when operating with RF coexistence impairments during DSDA operations. This may conserve power, network, communication, and/or computing resources that may have otherwise been used to detect and correct communication errors based at least in part on interference from one subscriber entity to another subscriber entity during DSDA operations.

Figure 4:
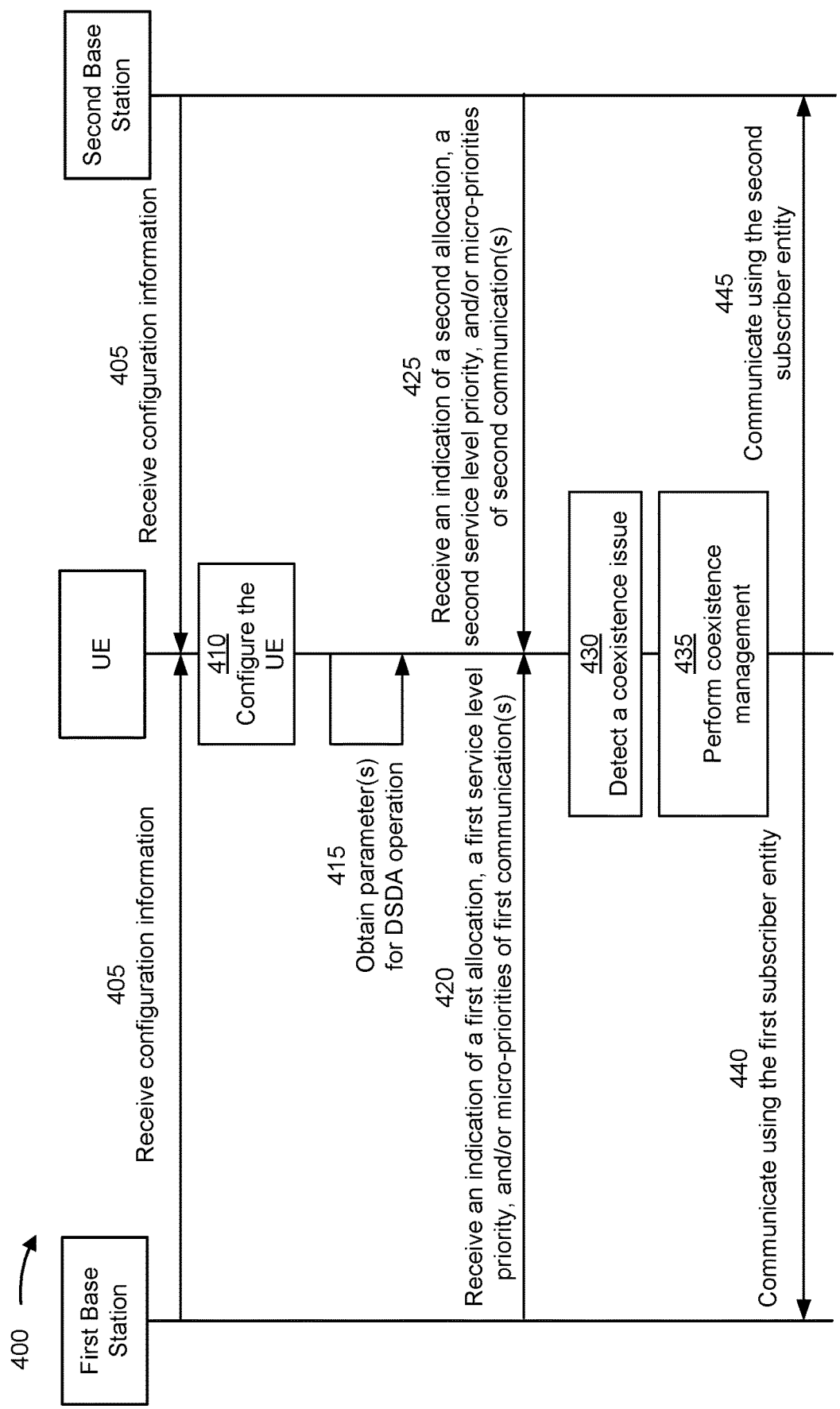
FIGS. 4-9 are diagrams illustrating examples associated with dual subscriber coexistence management, in accordance with the present disclosure.

FIG. 4 is a diagram illustrating an example 400 associated with dual subscriber coexistence management, in accordance with the present disclosure. As shown in FIG. 4, a first base station (e.g., base station 110) and a second base station (e.g., base station 110) may communicate with a UE (e.g., UE 120). In some aspects, the first base station, the second base station, and the UE may be part of one or more wireless networks (e.g., wireless network 100). The UE may have established a wireless connection with the first base station using a first subscriber entity, and the UE may have established a wireless connection with the second base station using a second subscriber entity prior to operations shown in FIG. 4. The UE may operate in a dual subscriber entity mode (e.g., a DSDA mode) for communicating with the first base station and the second base station. In some aspects, the first base station and the second base station may be co-located.

As shown by reference number 405, the UE may receive, from one or both of the first base station or the second base station, configuration information. In some aspects, the UE may receive the configuration information via one or more of RRC signaling, medium access control (MAC) control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to apply one or more coexistence management configurations in communications with the first base station and/or the second base station. In some aspects, the configuration information may indicate one or more parameters to be used for the one or more coexistence management configurations.

As shown by reference number 410, the UE may configure the UE based at least in part on the configuration information. In some aspects, the UE may be configured to perform one or more operations described herein based at least in part on the configuration information.

As shown by reference number 415, the UE may obtain one or more parameters for DSDA operation. For example, the UE may obtain one or more parameters associated with a dual subscriber operation of the UE that includes communicating using a first subscriber entity and a second subscriber entity. In some aspects, the UE may measure one or more reference signals, obtain information from one or more of the first base station or the second base station, and/or obtain a configuration of the UE.

In some aspects, the UE may monitor one or more of UE receive metrics or UE transmit metrics for communications associated with the first subscriber entity and the second subscriber entity. For example, the UE may monitor communications (e.g., in real-time) with one or more base stations. Additionally, or alternatively, the UE may monitor simulated communications. For example, the UE may transmit signals on a bandwidth associated with an uplink channel for the first subscriber entity (e.g., without an intended receiving device) and simultaneously sample signals on a bandwidth associated with a downlink channel for the second subscriber entity. Additionally, or alternatively, the UE may transmit signals on a bandwidth associated with an uplink channel for the second subscriber entity and simultaneously sample signals on a bandwidth associated with a downlink channel for the first subscriber entity.

In some aspects, the UE may obtain the one or more parameters based at least in part on metrics of components of the UE. For example, the one or more parameters may be associated with analog RF front-end filters, antenna isolation capabilities, RF front-end paths or connectors coupling, or isolation between RF-bands and/or paths used by the first subscriber entity and the second subscriber entity.

In some aspects, the UE may obtain the one or more parameters based at least in part on allocation-based metrics of communications via the first subscriber entity and of communications via the second subscriber entity. For example, whether an allocation of the communications via the first subscriber entity are harmonics of an allocation of the communications via the second subscriber entity.

In some aspects, the UE may obtain the one or more parameters based at least in part on configuration-based metrics associated with the communications via the first subscriber entity and associated with the communications via the second subscriber entity. For example, the one or more parameters may be based at least in part on timing, priorities, and/or QoS parameters associated with communications via the first subscriber entity and associated with the communications via the second subscriber entity.

In some aspects, the UE may obtain the one or more parameters based at least in part on service priorities of the communications via the first subscriber entity and of the communications via the second subscriber entity. For example, the parameters may be based at least in part on types of communications and/or associated priorities (e.g., prioritizing voice calls and/or real-time communications). In some aspects, the UE may obtain the one or more parameters based at least in part on micro-priorities of the communications via the first subscriber entity and of the communications via the second subscriber entity. For example, the communications via the first subscriber entity may have a high micro-priority during a first portion that overlaps communications via the second subscriber entity, and the communications via the second subscriber entity may have a high micro-priority during a second portion that overlaps communications via the first subscriber entity.

In some aspects, the UE may obtain the one or more parameters based at least in part on coexistence characterization inputs (e.g., indications) configured for the communications via the first subscriber entity and configured for the communications via the second subscriber entity. For example, the coexistence characterization inputs may be based at least in part on indications from the first base station and/or the second base station.

In some aspects, the UE may obtain the one or more parameters based at least in part on coexistence monitoring inputs (e.g., sampling signals at the UE) associated with the communications via the first subscriber entity and associated with the communications via the second subscriber entity.

In some aspects, the UE may obtain the one or more parameters based at least in part on determining a signal reliability associated with the communications via the first subscriber entity and a signal reliability associated with the communications via the second subscriber entity. For example, the one or more parameters may include SNR, RSSI, RSRP, RSRQ, Rx BLER, Tx BLER and/or ACK/NACK metrics associated with the communications via the first subscriber entity and/or the communications via the second subscriber entity. In some aspects, the one or more parameters may include degradation limits associated with the communications via the first subscriber entity and associated with the communications via the second subscriber entity As shown by reference number 420, the UE may receive, and the first base station may transmit, an indication of a first allocation, a first service level priority, and/or micro-priorities of one or more first communications associated with the first subscriber entity of the UE (e.g., communications via the first subscriber entity). As shown by reference number 425, the UE may receive, and the first base station may transmit, an indication of a second allocation, a second service level priority, and/or micro-priorities of one or more second communications associated with the second subscriber entity of the UE (e.g., communications via the second subscriber entity).

In some aspects, the UE may receive an indication of a first service level priority of the communications via the first subscriber entity an indication of a second service level priority of the communications via the second subscriber entity, an indication of a first allocation for the communications via the first subscriber entity, an indication of a second allocation for the communications via the second subscriber entity, and/or an indication of the micro-priorities of the communications via the first subscriber entity and of the communications via the second subscriber entity.

In some aspects, the micro-priorities of the communications via the first subscriber entity and the communications via the second subscriber entity indicate a first time period, of an allocation of resources for the communications via the first subscriber entity and of the communications via the second subscriber entity, during which the communications via the first subscriber entity have a priority that is higher than a priority of the communications via the second subscriber entity. Additionally, or alternatively, the micro-priorities may indicate a second time period, of the allocation of resources for the communications via the first subscriber entity and of the communications via the second subscriber entity, during which the communications via the second subscriber entity have a priority that is higher than a priority of the communications via the first subscriber entity.

As shown by reference number 430, the UE may detect one or more coexistence issues. In some aspects, the one or more coexistence issues include whether communications via a first allocation associated with the first subscriber entity are harmonics with communications via a second allocation associated with the second subscriber entity and/or whether intermodulation of communications via the first allocation or communications via the second allocation cause desensing associated with the first subscriber entity or the second subscriber entity. Additionally, or alternatively, the one or more coexistence issues may include whether transmitting uplink communications via one of the first allocation or the second allocation causes receive blocking for another of the second allocation or the first allocation and/or whether transmitting uplink communications via one of the first allocation associated with the first subscriber entity causes low noise amplifier damage at the UE. In some aspects, the one or more coexistence issues may be detected as one or more parameters for DSDA operation, as described in connection with reference number 415.

As shown by reference number 435, the UE may perform coexistence management. In some aspects, the coexistence management may include application of one or more coexistence management mitigation techniques, such as transmit off programming, transmit backoff, low noise amplifier protection via transmit backoff, or low noise amplifier protection via reception power control, among other examples. For example, the UE may turn off transmissions via one of the first subscriber entity or the second subscriber entity and/or reduce power of transmissions via one of the first subscriber entity or the second subscriber entity. Additionally, or alternatively, the UE may perform low noise amplifier protection (e.g., to avoid damaging the low noise amplifier) for a low noise amplifier associated with the second subscriber entity based at least in part on reducing power of transmission via the first subscriber entity and/or based at least in part on controlling reception power for the low noise amplifier to avoid damaging the low noise amplifier.

As shown by reference number 440, the UE may communicate with the first base station using the first subscriber entity. For example, the UE may transmit one or more uplink communications and/or receive one or more downlink communications using the first subscriber entity. For example, the one or more uplink communications and/or the one or more downlink communications using the first subscriber entity may have one or more coexistence management mitigation techniques applied.

As shown by reference number 445, the UE may communicate with the second base station using the second subscriber entity. For example, the UE may transmit one or more uplink communications and/or receive one or more downlink communications using the second subscriber entity. For example, the one or more uplink communications and/or the one or more downlink communications using the second subscriber entity may have one or more coexistence management mitigation techniques applied.

In this way, the UE in a DSDA operation may apply a coexistence management scheme that allows the UE to use the first subscriber entity and the second subscriber entity concurrently with RF coexistence impairments management that accounts for (e.g., is based at least in part on) service priorities across subscriber entities, micro-priorities across subscriber entities, pre-determined coexistence characterization parameters (e.g., configured in RRC signaling and/or in a protocol standard, among other examples), real-time (e.g., dynamically obtained) coexistence monitoring parameters, RF reliability parameters, and/or acceptable RF degradation limits (e.g., limits on necessary power amplifier backoff and how the power amplifier backoff affects performance), among other examples. Additionally, or alternatively, the first subscriber entity or the second subscriber entity may be prioritized to ensure QoS parameters are maintained for priority services (e.g., for voice calls and/or other live communications) when operating with RF coexistence impairments during DSDA operations. This may conserve power, network, communication, and/or computing resources that may have otherwise been used to detect and correct communication errors based at least in part on interference from one subscriber entity to another subscriber entity during DSDA operations.

As indicated above, FIG. 4 is provided as an example. Other examples may differ from what is described with regard to FIG. 4. For example, the first base station and the second base station may be a single base station that is configured for communications with the UE via the first subscriber entity and the second subscriber entity.

Figure 5:
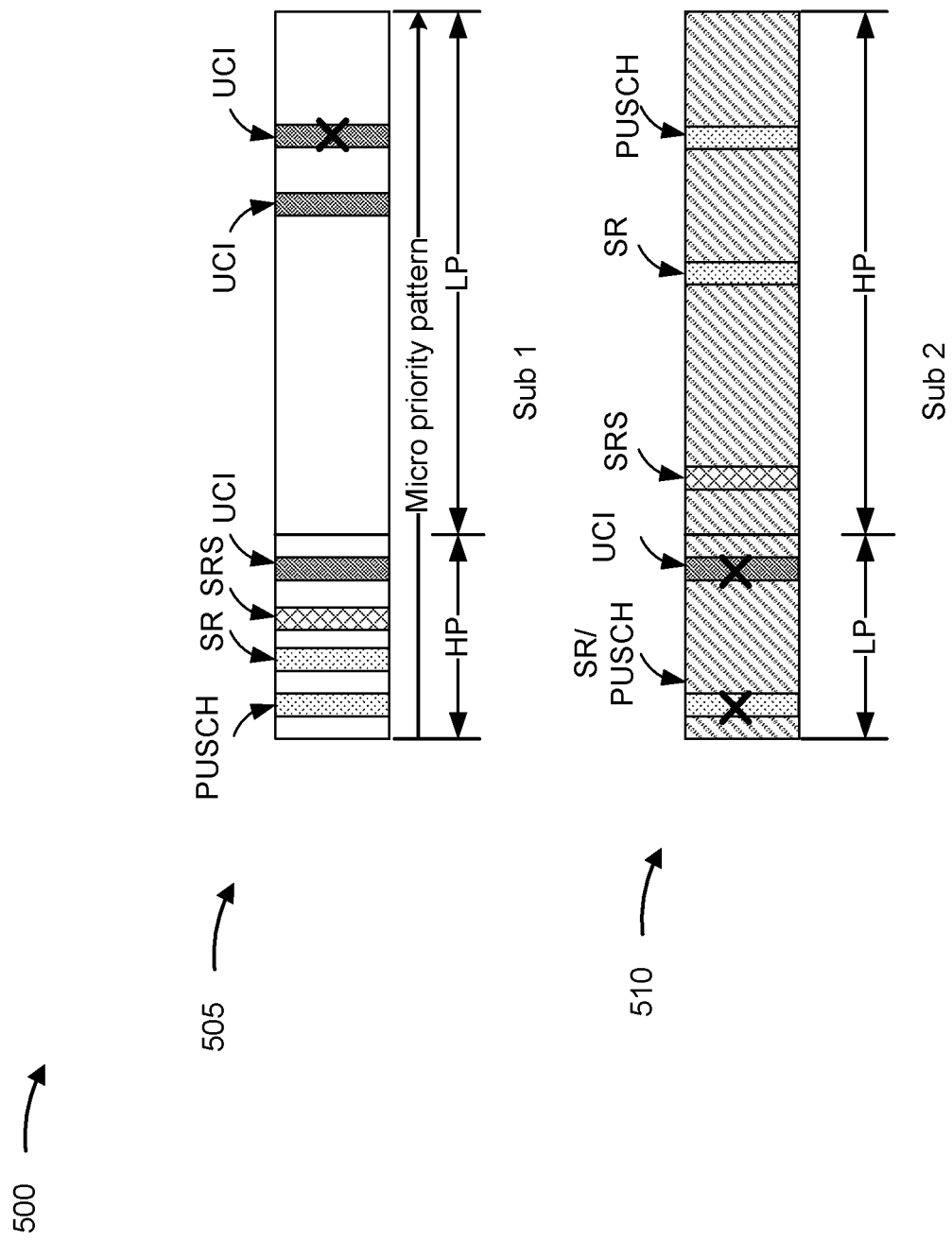

FIG. 5 is a diagram illustrating an example 500 associated with dual subscriber coexistence management, in accordance with the present disclosure. As shown in FIG. 5, a UE (e.g., UE 120) may communicate using a first subscriber entity and a second subscriber entity. In some aspects, the UE may be part of one or more wireless networks (e.g., wireless network 100) for communication with one or more base stations. The UE may have established a wireless connection with a first base station using the first subscriber entity, and the UE may have established a wireless connection with a second base station using the second subscriber entity prior to operations shown in FIG. 5. The UE may operate in a dual subscriber entity mode (e.g., a DSDA mode) for communicating with the first base station and the second base station. In some aspects, the first base station and the second base station may be co-located.

As shown in FIG. 5, the first subscriber entity of the UE may be configured with a first communication schedule 505, and the second subscriber entity of the UE may be configured with a second communication schedule 510 that overlaps in time with the first communication schedule 505. The first communication schedule 505 may include one or more scheduled communications and/or channels, such as a physical uplink shared channel (PUSCH), a scheduling request (SR), a sounding reference signal (SRS), and/or uplink control information (UCI), among other examples.

As shown, the UE may be configured with micro-priorities for the communications via the first subscriber entity and communications via the second subscriber entity. For example, the first subscriber entity may have a high priority, and the second subscriber entity may have a low priority during an earlier portion of the overlap in time. The first subscriber entity may have a low priority and the second subscriber entity may have a high priority during a later portion of the overlap in time.

Using micro-priorities may allow the UE to communicate with a low priority subscriber entity during at least a portion of the overlap in time that may otherwise be blocked to communicate via a high priority subscriber entity. For example, the first communication schedule 505 may include one or more canceled communications and/or channels (e.g., a UCI) that overlap with communications via the second subscriber entity when the second subscriber entity has a high priority. Additionally, or alternatively, the second communication schedule 510 may include one or more canceled communications and/or channels (e.g., a scheduling request (SR) and/or PUSCH, and a UCI) that overlap with communications via the first subscriber entity when the first subscriber entity has a high priority.

In some aspects, the UE may use mobile DSDA micro-priorities whereby a high-priority micro-priority high priority activity (e.g., a transmission and/or reception) is protected or prioritized versus a low-priority micro-priority activity with respect to mitigation and/or management procedures. In some aspects, the UE may perform dual subscriber coexistence management via a coexistence management controller that resides at the UE that is aware of micro-priorities of the first subscriber entity and the second subscriber entity.

As indicated above, FIG. 5 is provided as an example. Other examples may differ from what is described with regard to FIG. 5.

Figure 6:
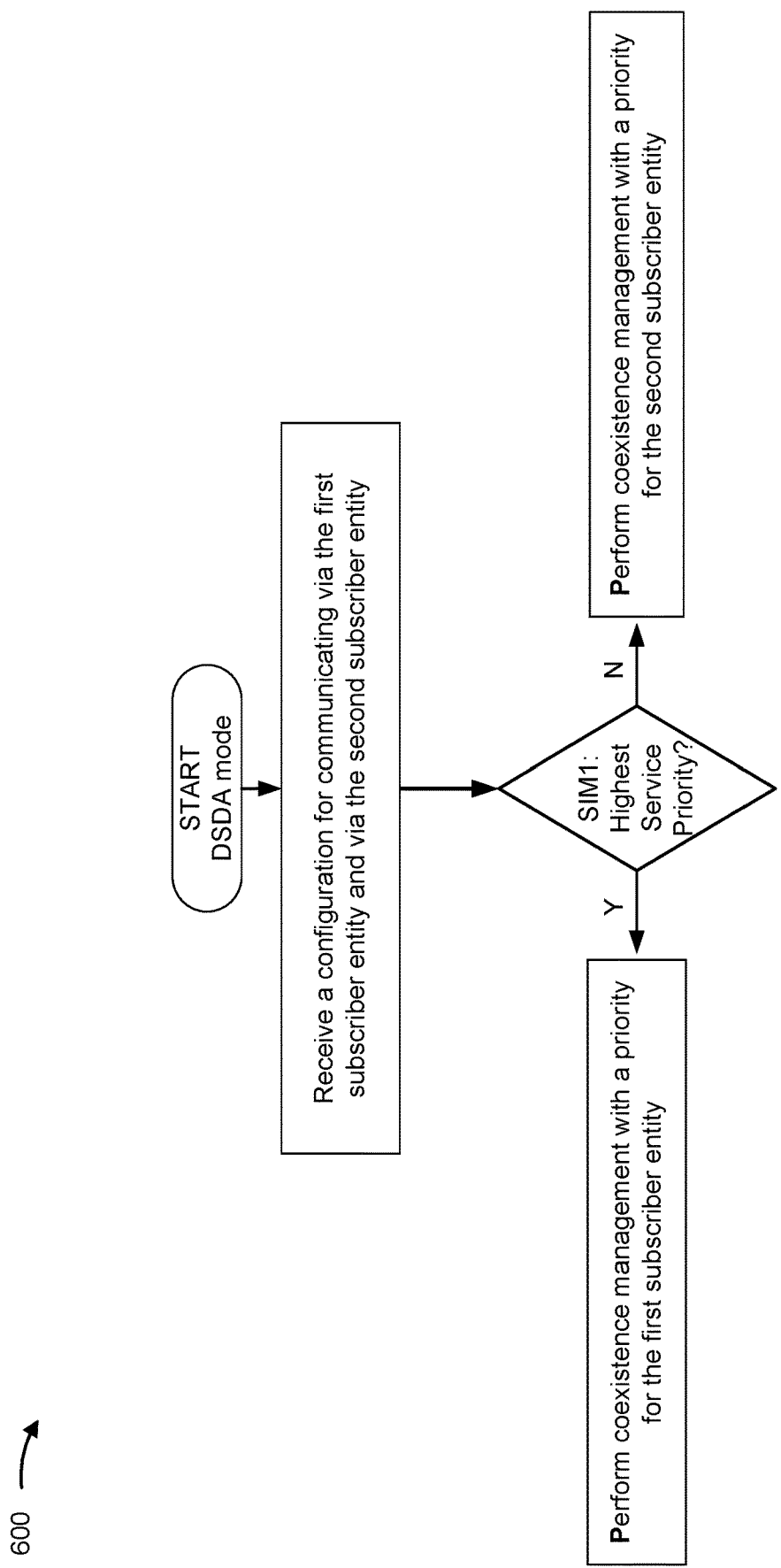

FIG. 6 is a diagram illustrating an example 600 associated with dual subscriber coexistence management, in accordance with the present disclosure. As shown in FIG. 6, a UE (e.g., UE 120) may communicate using a first subscriber entity and a second subscriber entity in a dual subscriber entity mode (e.g., a DSDA mode) for communicating with a first base station and a second base station.

As shown in FIG. 6, the UE may receive a configuration for communicating via the first subscriber entity and via the second subscriber entity. For example, the UE may receive transmission and/or reception bands and configured bandwidths for the first subscriber entity and the second subscriber entity. Additionally, or alternatively, the UE may determine a coexistence issue type (e.g., harmonics, intermodulation causing desensing, transmissions causing reception blocking, and/or RF transceiver spurs from mixer/local-oscillator coupling, among other examples). The UE may further receive a service level priority for the DSDA mode for the first subscriber entity and for the second subscriber entity.

The UE may determine whether the first subscriber entity (SIM1) has a highest service level priority (e.g., higher than the second subscriber entity). Based at least in part on the first subscriber entity having a highest service level priority, the UE may perform coexistence management with a priority for the first subscriber entity. For example, the UE may detect a spectrum overlap, the first subscriber entity being co-banded with the first subscriber entity, and/or the subscriber entity having adjacent channel leakage. The UE may adjust transmission power for the transmission via the first subscriber entity if a transmission allocation of the first subscriber entity overlaps with a reception allocation via the second subscriber entity, where the overlap can cause LNA device damage for a reception via the second subscriber entity. Additionally, or alternatively, the UE may blank reception via the second subscriber entity (e.g., to put the LNA into high isolation mode) to allow a full transmission dynamic power range for transmission via the first subscriber entity based at least in part on the transmission via the first subscriber entity overlapping with a reception via the second subscriber entity (e.g., based at least in part on spectrum overlap/co-banded and/or adjacent channel leakage, among other examples).

In some aspects, the UE may determine that a reception via the first subscriber entity may be desensed based at least in part on a transmission via the second subscriber entity. The UE may perform coexistence management based at least in part on applying a mitigation technique, such as blanking a transmission (e.g., turning off power for the transmission) for the second subscriber entity or reducing power for the transmission to a level corresponding to a threshold amount of desensing for the first subscriber entity reception. In some aspects, the threshold amount may be configurable (e.g., 3 db).

Based at least in part on the first subscriber entity not having a highest service level priority, the UE may perform coexistence management with a priority for the second subscriber entity. For example, the UE may detect a spectrum overlap, the first subscriber entity being co-banded with the first subscriber entity, and/or the subscriber entity having adjacent channel leakage. The UE may adjust transmission power if a transmission allocation of the second subscriber entity overlaps into a reception allocation of the second subscriber entity, which overlap can cause LNA device damage for a reception via the first subscriber entity. Additionally, or alternatively, the UE may blank reception via the first subscriber entity (e.g., to put the LNA into high isolation mode) to allow a full transmission dynamic power range for transmission via the second subscriber entity based at least in part on the transmission via the second subscriber entity overlapping with a reception via the first subscriber entity (e.g., based at least in part on spectrum overlap/co-banded and/or adjacent channel leakage, among other examples).

In some aspects, the UE may determine that a reception via the second subscriber entity may be desensed based at least in part on a transmission via the first subscriber entity. The UE may perform coexistence management based at least in part on applying a mitigation technique, such as blanking a transmission (e.g., turning off power for the transmission) for the first subscriber entity or reducing power for the transmission to a level corresponding to a threshold amount of desensing for the second subscriber entity reception. In some aspects, the threshold amount may be configurable (e.g., 3 db).

As indicated above, FIG. 6 is provided as an example. Other examples may differ from what is described with regard to FIG. 6.

Figure 7:
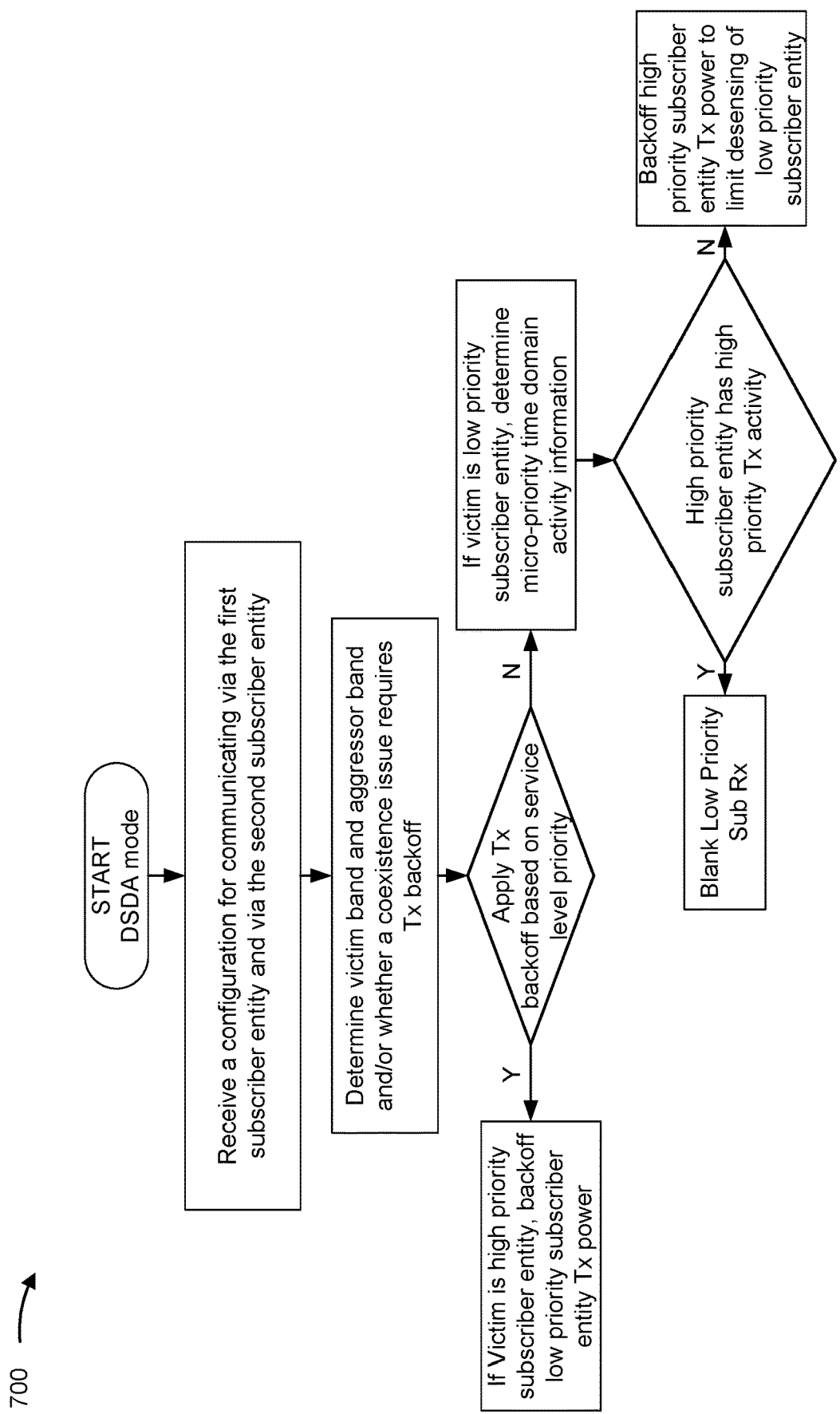

FIG. 7 is a diagram illustrating an example 700 associated with dual subscriber coexistence management, in accordance with the present disclosure. As shown in FIG. 7, a UE (e.g., UE 120) may communicate using a first subscriber entity and a second subscriber entity in a dual subscriber entity mode (e.g., a DSDA mode) for communicating with a first base station and a second base station. In some aspects, FIG. 7 shows DSDA coexistence management based at least in part on transmit power backoff mitigation.

As shown in FIG. 7, the UE may receive a configuration for communicating via the first subscriber entity and via the second subscriber entity. For example, the UE may receive transmission and/or reception bands and configured bandwidths for the first subscriber entity and the second subscriber entity. Additionally, or alternatively, the UE may determine a coexistence issue type (e.g., transmissions causing reception blocking, among other examples). The UE may further receive a service level priority for the DSDA mode for the first subscriber entity and for the second subscriber entity.

As shown in FIG. 7, the UE may determine a victim band and an aggressor band and/or whether a coexistence issue requires a transmission backoff (e.g., to reduce desensing and/or to avoid damaging an LNA). Based at least in part on the UE determining to apply a transmission backoff, the UE may apply the transmission backoff based at least in part on a service level priority. For example, based at least in part on the victim being a high priority subscriber entity, the UE may backoff a transmission power of a low priority subscriber entity.

Based at least in part on the victim being a low priority subscriber entity, the UE may determine micro-priority time domain activity information. For example, the UE may determine whether the low priority subscriber entity is in a high priority or low priority portion of an overlapping time with the low priority subscriber entity. If the high priority subscriber entity has a high priority transmission activity (e.g., Voice Tx real-time transport protocol (RTP), user Datagram protocol (UDP), and/or internet protocol (IP) vocoded communications), the UE may blank the low priority subscriber entity reception (e.g., to avoid desensing or damaging an LNA). If the high priority subscriber entity does not have a high priority transmission activity, the UE may backoff the high priority subscriber entity transmission power to limit desensing to the low priority subscriber entity.

As indicated above, FIG. 7 is provided as an example. Other examples may differ from what is described with regard to FIG. 7.

Figure 8:
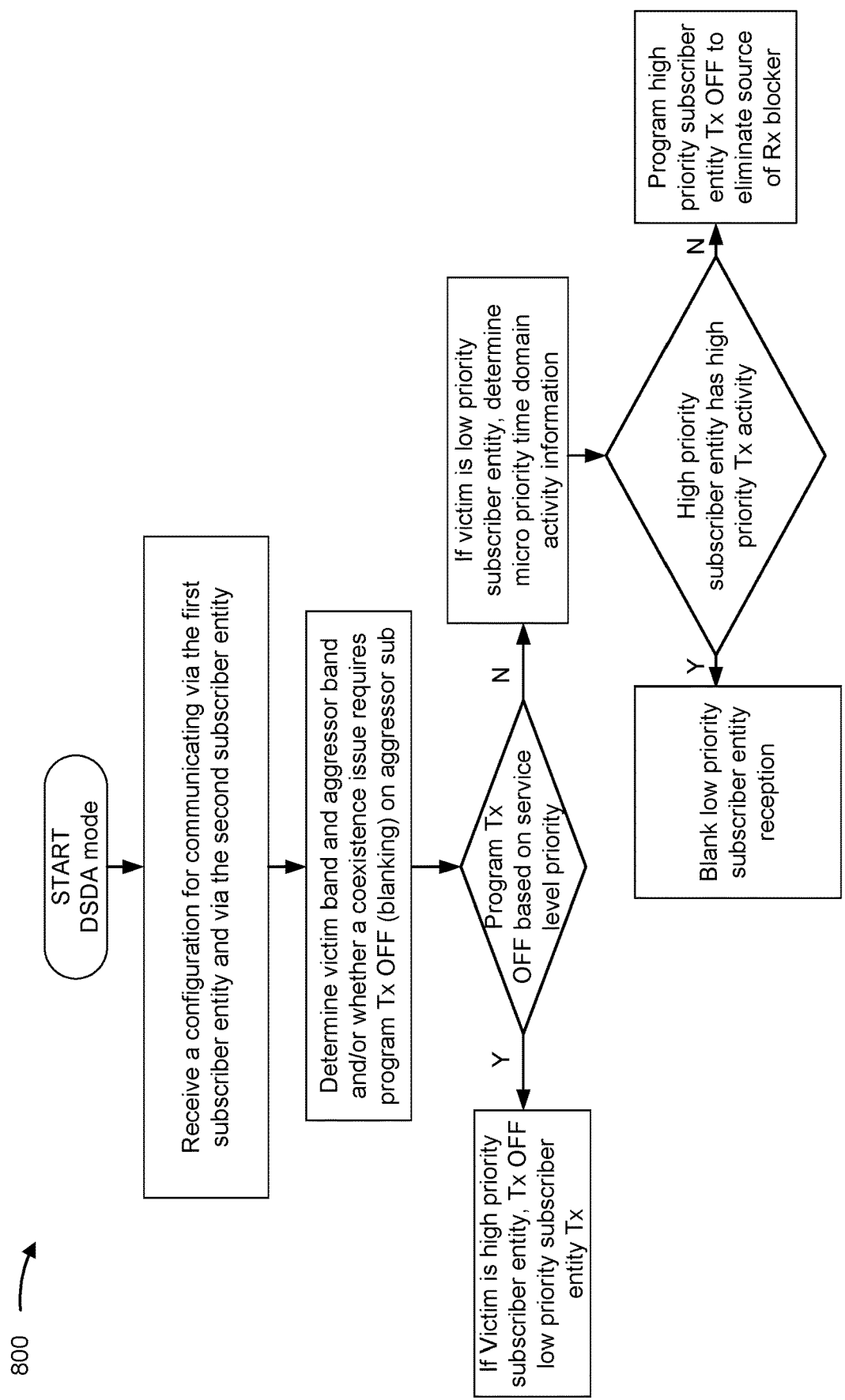

FIG. 8 is a diagram illustrating an example 800 associated with dual subscriber coexistence management, in accordance with the present disclosure. As shown in FIG. 8, a UE (e.g., UE 120) may communicate using a first subscriber entity and a second subscriber entity in a dual subscriber entity mode (e.g., a DSDA mode) for communicating with a first base station and a second base station. In some aspects, FIG. 8 shows DSDA coexistence management based at least in part on transmit OFF mitigation.

As shown in FIG. 8, the UE may receive a configuration for communicating via the first subscriber entity and via the second subscriber entity. For example, the UE may receive transmission and/or reception bands and configured bandwidths for the first subscriber entity and the second subscriber entity. Additionally, or alternatively, the UE may determine a coexistence issue type (e.g., transmissions causing reception blocking, among other examples). The UE may further receive a service level priority for the DSDA mode for the first subscriber entity and for the second subscriber entity.

As shown in FIG. 8, the UE may determine a victim band and an aggressor band and/or whether a coexistence issue requires a transmission OFF (e.g., blanking to reduce desensing and/or to avoid damaging an LNA). Based at least in part on the UE determining to apply a transmission OFF, the UE may apply the transmission OFF based at least in part on a service level priority. For example, based at least in part on the victim being a high priority subscriber entity, the UE may apply transmission OFF to transmission power of a low priority subscriber entity.

Based at least in part on the victim being a low priority subscriber entity, the UE may determine micro-priority time domain activity information. For example, the UE may determine whether the high priority subscriber entity is in a high priority or low priority portion of an overlapping time with the low priority subscriber entity. If the high priority subscriber entity has a high priority transmission activity (e.g., voice Tx RTP/UDP/IP vocoded communications), the UE may blank the low priority subscriber entity reception (e.g., to avoid desensing or damaging an LNA). For example, the UE may freeze baseband loops and/or turn OFF a reception LNA and/or reception chain for the low priority subscriber entity.

If the high priority subscriber entity does not have a high priority transmission activity, the UE may program the high priority subscriber entity to transmission OFF to eliminate a source of a receive blocker for reception via the high priority subscriber entity priority subscriber entity.

As indicated above, FIG. 8 is provided as an example. Other examples may differ from what is described with regard to FIG. 8.

Figure 9:
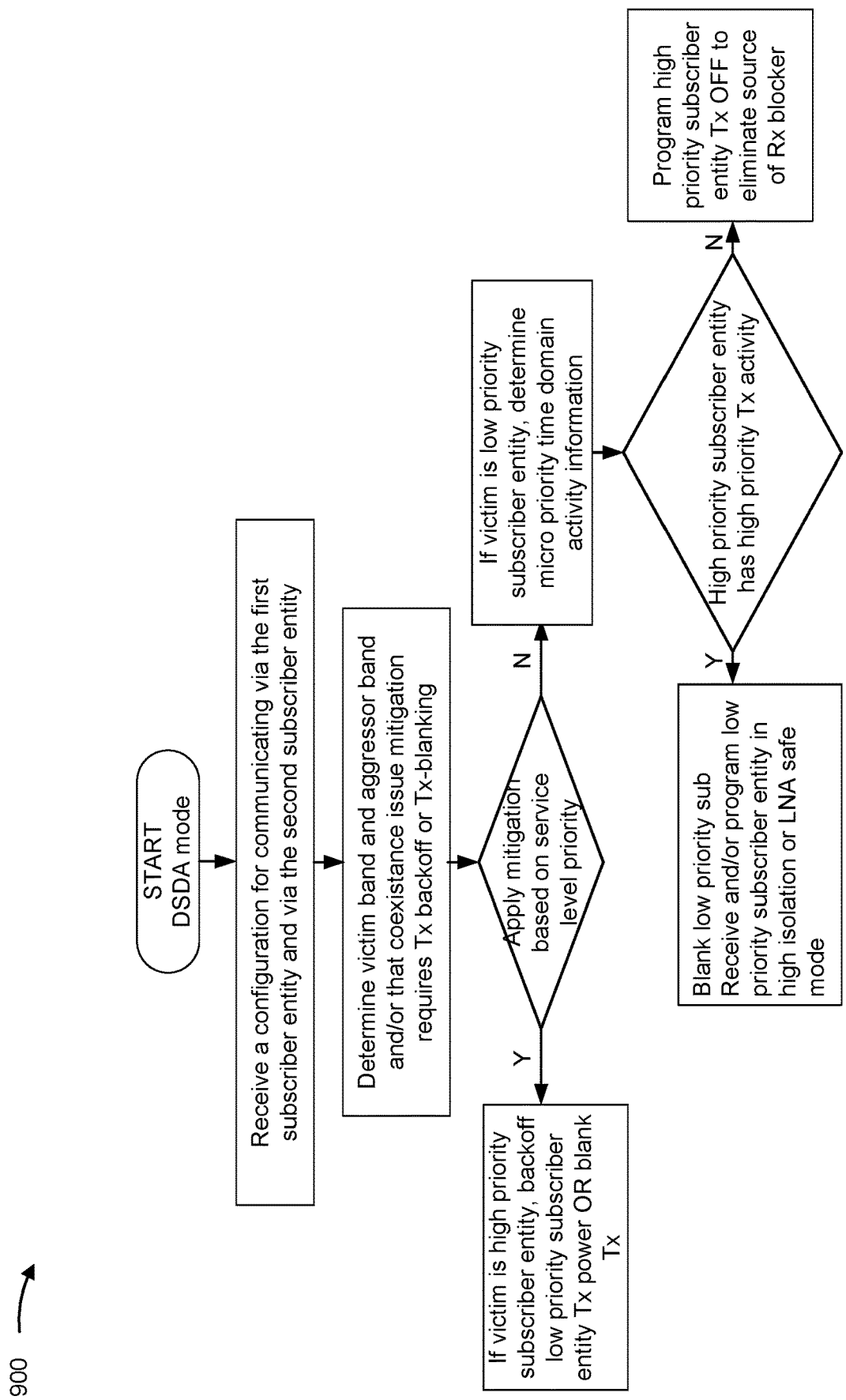

FIG. 9 is a diagram illustrating an example 900 associated with dual subscriber coexistence management, in accordance with the present disclosure. As shown in FIG. 9, a UE (e.g., UE 120) may communicate using a first subscriber entity and a second subscriber entity in a dual subscriber entity mode (e.g., a DSDA mode) for communicating with a first base station and a second base station. In some aspects, FIG. 9 shows DSDA coexistence management based at least in part on transmit power backoff for LNA protection mitigation.

As shown in FIG. 9, the UE may receive a configuration for communicating via the first subscriber entity and via the second subscriber entity. For example, the UE may receive transmission and/or reception bands and configured bandwidths for the first subscriber entity and the second subscriber entity. Additionally, or alternatively, the UE may determine a coexistence issue type (e.g., transmissions causing reception blocking, among other examples), where a first subscriber entity transmission slot and a second subscriber entity reception slot overlap in time and may cause LNA damage and/or reliability issues. The UE may further receive a service level priority for the DSDA mode for the first subscriber entity and for the second subscriber entity.

As shown in FIG. 9, the UE may determine a victim band and an aggressor band and/or whether a coexistence issue requires a transmission backoff or transmission blanking (e.g., to reduce desensing and/or to avoid damaging an LNA). Based at least in part on the UE determining to apply mitigation (e.g., transmission backoff or transmission blanking), the UE may apply the transmission backoff or transmission blanking based at least in part on a service level priority. For example, based at least in part on the victim being a high priority subscriber entity, the UE may backoff or blank a transmission power of a low priority subscriber entity.

Based at least in part on the victim being a low priority subscriber entity, the UE may determine micro-priority time domain activity information. For example, the UE may determine whether the high priority subscriber entity is in a high priority or low priority portion of an overlapping time with the low priority subscriber entity. If the high priority subscriber entity has a high priority transmission activity (e.g., Voice Tx RTP/UDP/IP vocoded communications), the UE may blank the low priority subscriber entity reception or program the low priority subscriber entity in a high isolation or LNA safe mode (e.g., to avoid desensing or damaging an LNA).

If the high priority subscriber entity does not have a high priority transmission activity, the UE may program the high priority subscriber entity to transmission OFF to eliminate a source of a receive blocker for reception via the high priority subscriber entity priority subscriber entity.

As indicated above, FIG. 9 is provided as an example. Other examples may differ from what is described with regard to FIG. 9.

Figure 10:
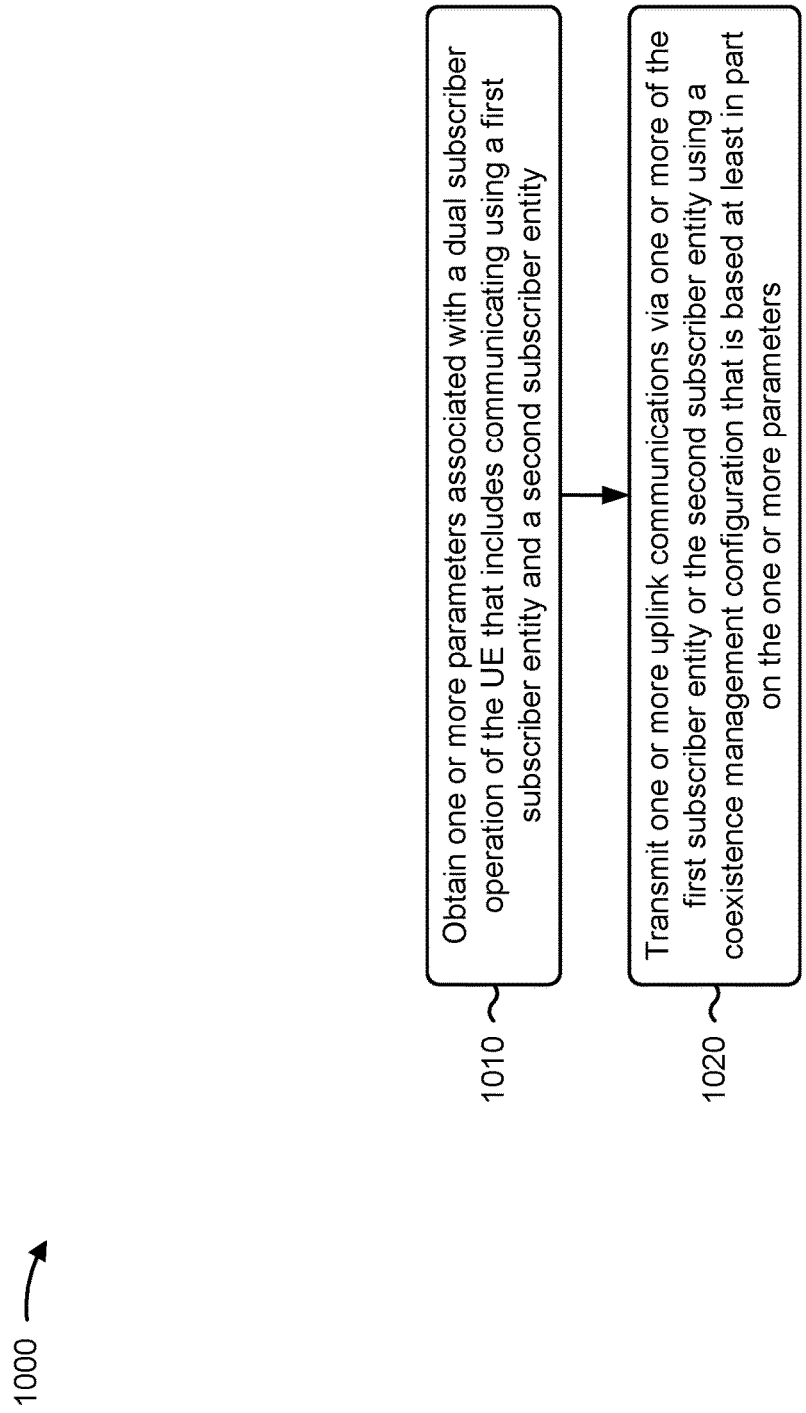
FIG. 10 is a diagram illustrating an example process associated with dual subscriber coexistence management, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with dual subscriber coexistence management.

As shown in FIG. 10, in some aspects, process 1000 may include obtaining one or more parameters associated with a dual subscriber operation of the UE that includes communicating using a first subscriber entity and a second subscriber entity (block 1010). For example, the UE (e.g., using communication manager 140 and/or communication manager 1108, depicted in FIG. 11) may obtain one or more parameters associated with a dual subscriber operation of the UE that includes communicating using a first subscriber entity and a second subscriber entity, as described above.

As further shown in FIG. 10, in some aspects, process 1000 may include transmitting one or more uplink communications via one or more of the first subscriber entity or the second subscriber entity using a coexistence management configuration that is based at least in part on the one or more parameters (block 1020). For example, the UE (e.g., using communication manager 140 and/or transmission component 1104, depicted in FIG. 11) may transmit one or more uplink communications via one or more of the first subscriber entity or the second subscriber entity using a coexistence management configuration that is based at least in part on the one or more parameters, as described above.

Process 1000 may include additional aspects, such as any single aspect or any combination of aspects described below and/or in connection with one or more other processes described elsewhere herein.

In a first aspect, obtaining the one or more parameters comprises monitoring one or more of UE receive metrics or UE transmit metrics for communications associated with the first subscriber entity and the second subscriber entity.

In a second aspect, alone or in combination with the first aspect, monitoring the UE receive metrics or the transmit metrics comprises monitoring communications with one or more base stations, or monitoring simulated communications.

In a third aspect, alone or in combination with one or more of the first and second aspects, obtaining the one or more parameters comprises obtaining one or more of metrics of components of the UE, allocation-based metrics of communications via the first subscriber entity and of communications via the second subscriber entity, configuration-based metrics associated with the communications via the first subscriber entity and associated with the communications via the second subscriber entity, service priorities of the communications via the first subscriber entity and of the communications via the second subscriber entity, micro-priorities of the communications via the first subscriber entity and of the communications via the second subscriber entity, characterization inputs configured for the communications via the first subscriber entity and configured for the communications via the second subscriber entity, monitoring inputs associated with the communications via the first subscriber entity and associated with the communications via the second subscriber entity, signaling reliability associated with the communications via the first subscriber entity and associated with the communications via the second subscriber entity, or degradation limits associated with the communications via the first subscriber entity and associated with the communications via the second subscriber entity.

In a fourth aspect, alone or in combination with one or more of the first through third aspects, process 1000 includes receiving, via one or more of a first base station associated with the first subscriber entity or a second base station associated with the second subscriber entity, one or more of an indication of a first service level priority of the communications via the first subscriber entity, an indication of a second service level priority of the communications via the second subscriber entity, an indication of a first allocation for the communications via the first subscriber entity, an indication of a second allocation for the communications via the second subscriber entity, or an indication of the micro-priorities of the communications via the first subscriber entity and of the communications via the second subscriber entity.

In a fifth aspect, alone or in combination with one or more of the first through fourth aspects, the micro-priorities of the communications via the first subscriber entity and of the communications via the second subscriber entity comprise an indication of a first time period, of an allocation of resources for the communications via the first subscriber entity and of the communications via the second subscriber entity, during which the communications via the first subscriber entity have a priority that is higher than a priority of the communications via the second subscriber entity, and an indication of a second time period, of the allocation of resources for the communications via the first subscriber entity and of the communications via the second subscriber entity, during which the communications via the second subscriber entity have a priority that is higher than a priority of the communications via the first subscriber entity.

In a sixth aspect, alone or in combination with one or more of the first through fifth aspects, the coexistence management configuration comprises application of one or more of transmitting off programming, transmitting backoff, low noise amplifier protection via transmit backoff, or low noise amplifier protection via reception power control.

In a seventh aspect, alone or in combination with one or more of the first through sixth aspects, the one or more parameters comprise one or more dual subscriber coexistence metrics, and wherein one or more of the one or more dual subscriber coexistence metrics comprise one or more of whether communications via a first allocation associated with the first subscriber entity are harmonics with communications via a second allocation associated with the second subscriber entity, whether intermodulation of communications via the first allocation or communications via the second allocation cause desensing associated with the first subscriber entity or the second subscriber entity, whether transmitting uplink communications via one of the first allocation or the second allocation causes receive blocking for another of the second allocation or the first allocation, or whether transmitting uplink communications via one of the first allocation associated with the first subscriber entity causes low noise amplifier damage at the UE.

In an eighth aspect, alone or in combination with one or more of the first through seventh aspects, the dual subscriber operation of the UE comprises a dual-subscriber-dual-active operation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
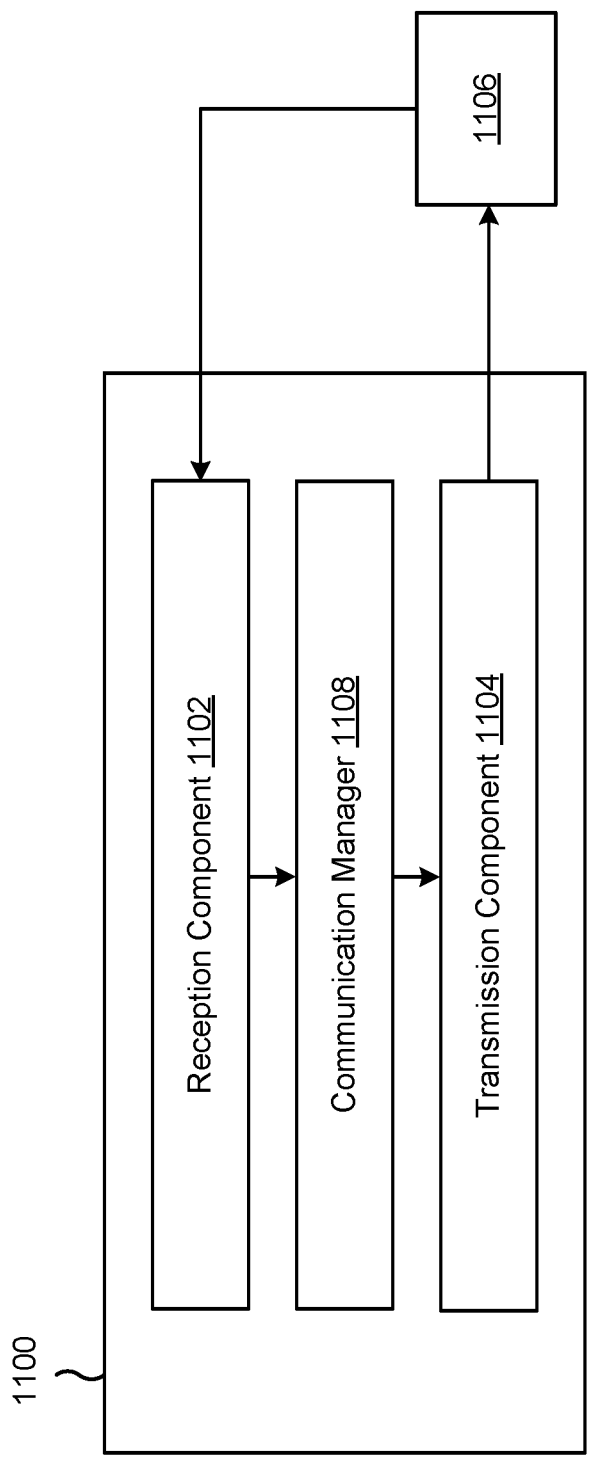
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 140).

In some aspects, the apparatus 1100 may be configured to perform one or more operations described herein in connection with FIGS. 4-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1108 may obtain one or more parameters associated with a dual subscriber operation of the UE that includes communicating using a first subscriber entity and a second subscriber entity. The transmission component 1104 may transmit one or more uplink communications via one or more of the first subscriber entity or the second subscriber entity using a coexistence management configuration that is based at least in part on the one or more parameters.

The reception component 1102 may receive, via one or more of a first base station associated with the first subscriber entity or a second base station associated with the second subscriber entity, one or more of an indication of a first service level priority of the communications via the first subscriber entity, an indication of a second service level priority of the communications via the second subscriber entity, an indication of a first allocation for the communications via the first subscriber entity, an indication of a second allocation for the communications via the second subscriber entity, or an indication of the micro-priorities of the communications via the first subscriber entity and of the communications via the second subscriber entity.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: obtaining one or more parameters associated with a dual subscriber operation of the UE that includes communicating using a first subscriber entity and a second subscriber entity; and transmitting one or more uplink communications via one or more of the first subscriber entity or the second subscriber entity using a coexistence management configuration that is based at least in part on the one or more parameters.

Aspect 2: The method of Aspect 1, wherein obtaining the one or more parameters comprises: monitoring one or more of UE receive metrics or UE transmit metrics for communications associated with the first subscriber entity and the second subscriber entity.

Aspect 3: The method of Aspect 2, wherein monitoring the UE receive metrics or the transmit metrics comprises: monitoring communications with one or more base stations, or monitoring simulated communications.

Aspect 4: The method of any of Aspects 1-3, wherein obtaining the one or more parameters comprises obtaining one or more of: metrics of components of the UE, allocation-based metrics of communications via the first subscriber entity and of communications via the second subscriber entity, configuration-based metrics associated with the communications via the first subscriber entity and associated with the communications via the second subscriber entity, service priorities of the communications via the first subscriber entity and of the communications via the second subscriber entity, micro-priorities of the communications via the first subscriber entity and of the communications via the second subscriber entity, coexistence characterization inputs configured for the communications via the first subscriber entity and configured for the communications via the second subscriber entity, coexistence monitoring inputs associated with the communications via the first subscriber entity and associated with the communications via the second subscriber entity, signal reliability associated with the communications via the first subscriber entity and associated with the communications via the second subscriber entity, or degradation limits associated with the communications via the first subscriber entity and associated with the communications via the second subscriber entity.

Aspect 5: The method of Aspect 4, further comprising receiving, via one or more of a first base station associated with the first subscriber entity or a second base station associated with the second subscriber entity, one or more of: an indication of a first service level priority of the communications via the first subscriber entity, an indication of a second service level priority of the communications via the second subscriber entity, an indication of a first allocation for the communications via the first subscriber entity, an indication of a second allocation for the communications via the second subscriber entity, or an indication of the micro-priorities of the communications via the first subscriber entity and of the communications via the second subscriber entity.

Aspect 6: The method of any of Aspects 4 or 5, wherein the micro-priorities of the communications via the first subscriber entity and of the communications via the second subscriber entity comprise: an indication of a first time period, of an allocation of resources for the communications via the first subscriber entity and of the communications via the second subscriber entity, during which the communications via the first subscriber entity have a priority that is higher than a priority of the communications via the second subscriber entity, and an indication of a second time period, of the allocation of resources for the communications via the first subscriber entity and of the communications via the second subscriber entity, during which the communications via the second subscriber entity have a priority that is higher than a priority of the communications via the first subscriber entity.

Aspect 7: The method of any of Aspects 1-6, wherein the coexistence management configuration comprises application of one or more of: transmit off programming, transmit backoff, low noise amplifier protection via transmit backoff, or low noise amplifier protection via reception power control.

Aspect 8: The method of any of Aspects 1-7, wherein the one or more parameters comprise one or more dual subscriber coexistence metrics, and wherein one or more of the one or more dual subscriber coexistence metrics comprise one or more of: whether communications via a first allocation associated with the first subscriber entity are harmonics with communications via a second allocation associated with the second subscriber entity, whether intermodulation of communications via the first allocation or communications via the second allocation cause desensing associated with the first subscriber entity or the second subscriber entity, whether transmitting uplink communications via one of the first allocation or the second allocation causes receive blocking for another of the second allocation or the first allocation, or whether transmitting uplink communications via one of the first allocation associated with the first subscriber entity causes low noise amplifier damage at the UE.

Aspect 9: The method of any of Aspects 1-8, wherein the dual subscriber operation of the UE comprises a dual-subscriber-dual-active operation.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      obtain one or more parameters associated with a dual subscriber operation of the UE that includes communicating using a first subscriber entity and a second subscriber entity, wherein the one or more parameters are based at least in part on a comparison of:
         one or more communication metrics monitored in real time in association with concurrent communication activities by the first subscriber entity and the second subscriber entity, and
         the one or more communication metrics monitored in real time in association with communication by one of the first subscriber entity or the second subscriber entity when the other of the second subscriber entity or the first subscriber entity is inactive,
         wherein the one or more communication metrics include a signal to noise ratio, a block error rate, a received signal strength indicator, or an acknowledgement/non-acknowledgement metric; and
      transmit one or more uplink communications via one or more of the first subscriber entity or the second subscriber entity using a coexistence management configuration that is based at least in part on the one or more parameters.

2. The UE of claim 1, wherein the one or more processors, to obtain the one or more parameters, are configured to:
   monitor communications with one or more base stations to monitor UE receive metrics or UE transmit metrics.

3. The UE of claim 1, wherein the one or more processors, to obtain the one or more parameters, are configured to obtain one or more of:
   metrics of components of the UE,
   allocation-based metrics of communications via the first subscriber entity and of communications via the second subscriber entity,
   configuration-based metrics associated with the communications via the first subscriber entity and associated with the communications via the second subscriber entity,
   service priorities of the communications via the first subscriber entity and of the communications via the second subscriber entity,
   micro-priorities of the communications via the first subscriber entity and of the communications via the second subscriber entity,
   coexistence characterization inputs configured for the communications via the first subscriber entity and configured for the communications via the second subscriber entity,
   coexistence monitoring inputs associated with the communications via the first subscriber entity and associated with the communications via the second subscriber entity,
   signal reliability associated with the communications via the first subscriber entity and associated with the communications via the second subscriber entity, or
   degradation limits associated with the communications via the first subscriber entity and associated with the communications via the second subscriber entity.

4. The UE of claim 3, wherein the one or more processors are further configured to receive, via one or more of a first base station associated with the first subscriber entity or a second base station associated with the second subscriber entity, one or more of:
   an indication of a first service level priority of the communications via the first subscriber entity,
   an indication of a second service level priority of the communications via the second subscriber entity,
   an indication of a first allocation for the communications via the first subscriber entity,
   an indication of a second allocation for the communications via the second subscriber entity, or
   an indication of the micro-priorities of the communications via the first subscriber entity and of the communications via the second subscriber entity.

5. The UE of claim 3, wherein the micro-priorities of the communications via the first subscriber entity and of the communications via the second subscriber entity comprise:
   an indication of a first time period, of an allocation of resources for the communications via the first subscriber entity and of the communications via the second subscriber entity, during which the communications via the first subscriber entity have a priority that is higher than a priority of the communications via the second subscriber entity, and
   an indication of a second time period, of the allocation of resources for the communications via the first subscriber entity and of the communications via the second subscriber entity, during which the communications via the second subscriber entity have a priority that is higher than a priority of the communications via the first subscriber entity.

6. The UE of claim 1, wherein the coexistence management configuration comprises application of one or more of:
   transmit off programming, transmit backoff,
low noise amplifier protection via transmit backoff, or
low noise amplifier protection via reception power control.

7. The UE of claim 1, wherein the one or more parameters comprise one or more dual subscriber coexistence metrics, and
wherein one or more of the one or more dual subscriber coexistence metrics comprise one or more of:
whether communications via a first allocation associated with the first subscriber entity are harmonics with communications via a second allocation associated with the second subscriber entity,
whether intermodulation of communications via the first allocation or communications via the second allocation cause desensing associated with the first subscriber entity or the second subscriber entity,
whether transmitting uplink communications via one of the first allocation or the second allocation causes receive blocking for another of the second allocation or the first allocation, or
whether transmitting uplink communications via one of the first allocation associated with the first subscriber entity causes low noise amplifier damage at the UE.

8. The UE of claim 1, wherein the dual subscriber operation of the UE comprises a dual-subscriber-dual-active operation.

9. The UE of claim 1, wherein the one or more processors, to obtain the one or more parameters, are configured to:
monitor simulated communications for the first subscriber entity and the second subscriber entity.

10. The UE of claim 9, wherein the simulated communications include signals transmitted on a bandwidth associated with an uplink channel for the first subscriber entity or the second subscriber entity, the signals being transmitted without an intended receiving device.

11. The UE of claim 9, wherein the simulated communications include signals sampled on a bandwidth associated with a downlink channel for the first subscriber entity or the second subscriber entity.

12. The UE of claim 1, wherein the one or more processors are further configured to:
determine a coexistence scenario for communicating using the first subscriber entity and the second subscriber entity based at least in part on an offline characterization.

13. A non-transitory computer-readable medium storing a set of instructions for wireless communication, the set of instructions comprising:
one or more instructions that, when executed by one or more processors of a user equipment (UE), cause the UE to:
obtain one or more parameters associated with a dual subscriber operation of the UE that includes communicating using a first subscriber entity and a second subscriber entity, wherein the one or more parameters are based at least in part on a comparison of:
one or more communication metrics monitored in real time in association with concurrent communication activities by the first subscriber entity and the second subscriber entity, and
the one or more communication metrics monitored in real time in association with communication by one of the first subscriber entity or the second subscriber entity when the other of the second subscriber entity or the first subscriber entity is inactive,
wherein the one or more communication metrics include a signal to noise ratio, a block error rate, a received signal strength indicator, or an acknowledgement/non-acknowledgement metric; and
transmit one or more uplink communications via one or more of the first subscriber entity or the second subscriber entity using a coexistence management configuration that is based at least in part on the one or more parameters.

14. The non-transitory computer-readable medium of claim 13, wherein the one or more instructions, that cause the UE to obtain the one or more parameters, cause the UE to:
monitor communications with one or more base stations to monitor UE receive metrics or UE transmit metrics.

15. The non-transitory computer-readable medium of claim 13, wherein the one or more instructions, that cause the UE to obtain the one or more parameters, cause the UE to obtain one or more of:
metrics of components of the UE,
allocation-based metrics of communications via the first subscriber entity and of communications via the second subscriber entity,
configuration-based metrics associated with the communications via the first subscriber entity and associated with the communications via the second subscriber entity,
service priorities of the communications via the first subscriber entity and of the communications via the second subscriber entity,
micro-priorities of the communications via the first subscriber entity and of the communications via the second subscriber entity,
coexistence characterization inputs configured for the communications via the first subscriber entity and configured for the communications via the second subscriber entity,
coexistence monitoring inputs associated with the communications via the first subscriber entity and associated with the communications via the second subscriber entity,
signal reliability associated with the communications via the first subscriber entity and associated with the communications via the second subscriber entity, or
degradation limits associated with the communications via the first subscriber entity and associated with the communications via the second subscriber entity.

16. The non-transitory computer-readable medium of claim 15, wherein the one or more instructions further cause the UE to receive, via one or more of a first base station associated with the first subscriber entity or a second base station associated with the second subscriber entity, one or more of:
an indication of a first service level priority of the communications via the first subscriber entity,
an indication of a second service level priority of the communications via the second subscriber entity,
an indication of a first allocation for the communications via the first subscriber entity,
an indication of a second allocation for the communications via the second subscriber entity, or an indication of the micro-priorities of the communications via the first subscriber entity and of the communications via the second subscriber entity.

17. The non-transitory computer-readable medium of claim 13, wherein the one or more parameters comprise one or more dual subscriber coexistence metrics, and
wherein one or more of the one or more dual subscriber coexistence metrics comprise one or more of:
whether communications via a first allocation associated with the first subscriber entity are harmonics with communications via a second allocation associated with the second subscriber entity,
whether intermodulation of communications via the first allocation or communications via the second allocation cause desensing associated with the first subscriber entity or the second subscriber entity,
whether transmitting uplink communications via one of the first allocation or the second allocation causes receive blocking for another of the second allocation or the first allocation, or
whether transmitting uplink communications via one of the first allocation associated with the first subscriber entity causes low noise amplifier damage at the UE.

18. An apparatus for wireless communication, comprising:
means for obtaining one or more parameters associated with a dual subscriber operation of the apparatus that includes communicating using a first subscriber entity and a second subscriber entity, wherein the one or more parameters are based at least in part on a comparison of:
one or more communication metrics monitored in real time in association with concurrent communication activities by the first subscriber entity and the second subscriber entity, and
the one or more communication metrics monitored in real time in association with communication by one of the first subscriber entity or the second subscriber entity when the other of the second subscriber entity or the first subscriber entity is inactive,
wherein the one or more communication metrics include a signal to noise ratio, a block error rate, a received signal strength indicator, or an acknowledgement/non-acknowledgement metric; and
means for transmitting one or more uplink communications via one or more of the first subscriber entity or the second subscriber entity using a coexistence management configuration that is based at least in part on the one or more parameters.

19. The apparatus of claim 18, wherein the means for obtaining the one or more parameters comprises:
means for monitoring communications with one or more base stations to monitor apparatus receive metrics or apparatus transmit metrics.

20. The apparatus of claim 18, wherein the means for obtaining the one or more parameters comprises means for obtaining one or more of:
metrics of components of the apparatus,
allocation-based metrics of communications via the first subscriber entity and of communications via the second subscriber entity,
configuration-based metrics associated with the communications via the first subscriber entity and associated with the communications via the second subscriber entity,
service priorities of the communications via the first subscriber entity and of the communications via the second subscriber entity,
micro-priorities of the communications via the first subscriber entity and of the communications via the second subscriber entity,
coexistence characterization inputs configured for the communications via the first subscriber entity and configured for the communications via the second subscriber entity,
coexistence monitoring inputs associated with the communications via the first subscriber entity and associated with the communications via the second subscriber entity,
signal reliability associated with the communications via the first subscriber entity and associated with the communications via the second subscriber entity, or
degradation limits associated with the communications via the first subscriber entity and associated with the communications via the second subscriber entity.

21. The apparatus of claim 20, further comprising means for receiving, via one or more of a first base station associated with the first subscriber entity or a second base station associated with the second subscriber entity, one or more of:
an indication of a first service level priority of the communications via the first subscriber entity,
an indication of a second service level priority of the communications via the second subscriber entity,
an indication of a first allocation for the communications via the first subscriber entity,
an indication of a second allocation for the communications via the second subscriber entity, or
an indication of the micro-priorities of the communications via the first subscriber entity and of the communications via the second subscriber entity.

22. The apparatus of claim 18, wherein the one or more parameters comprise one or more dual subscriber coexistence metrics, and
wherein one or more of the one or more dual subscriber coexistence metrics comprise one or more of:
whether communications via a first allocation associated with the first subscriber entity are harmonics with communications via a second allocation associated with the second subscriber entity,
whether intermodulation of communications via the first allocation or communications via the second allocation cause desensing associated with the first subscriber entity or the second subscriber entity,
whether transmitting uplink communications via one of the first allocation or the second allocation causes receive blocking for another of the second allocation or the first allocation, or
whether transmitting uplink communications via one of the first allocation associated with the first subscriber entity causes low noise amplifier damage at the apparatus.

23. A method of wireless communication performed by a user equipment (UE), comprising:
obtaining one or more parameters associated with a dual subscriber operation of the UE that includes communicating using a first subscriber entity and a second subscriber entity, wherein the one or more parameters are based at least in part on a comparison of:
one or more communication metrics monitored in real time in association with concurrent communication activities by the first subscriber entity and the second subscriber entity, and
the one or more communication metrics monitored in real time in association with communication by one of the first subscriber entity or the second subscriber entity when the other of the second subscriber entity or the first subscriber entity is inactive, wherein the one or more communication metrics include a signal to noise ratio, a block error rate, a received signal strength indicator, or an acknowledgement/non-acknowledgement metric; and transmitting one or more uplink communications via one or more of the first subscriber entity or the second subscriber entity using a coexistence management configuration that is based at least in part on the one or more parameters.

24. The method of claim 23, wherein obtaining the one or more parameters comprises:

monitoring communications with one or more base stations to monitor UE receive metrics or UE transmit metrics.

25. The method of claim 23, wherein obtaining the one or more parameters comprises obtaining one or more of:

metrics of components of the UE, allocation-based metrics of communications via the first subscriber entity and of communications via the second subscriber entity, configuration-based metrics associated with the communications via the first subscriber entity and associated with the communications via the second subscriber entity, service priorities of the communications via the first subscriber entity and of the communications via the second subscriber entity, micro-priorities of the communications via the first subscriber entity and of the communications via the second subscriber entity, coexistence characterization inputs configured for the communications via the first subscriber entity and configured for the communications via the second subscriber entity, coexistence monitoring inputs associated with the communications via the first subscriber entity and associated with the communications via the second subscriber entity, signal reliability associated with the communications via the first subscriber entity and associated with the communications via the second subscriber entity, or degradation limits associated with the communications via the first subscriber entity and associated with the communications via the second subscriber entity.

26. The method of claim 25, further comprising receiving, via one or more of a first base station associated with the first subscriber entity or a second base station associated with the second subscriber entity, one or more of:

an indication of a first service level priority of the communications via the first subscriber entity, an indication of a second service level priority of the communications via the second subscriber entity, an indication of a first allocation for the communications via the first subscriber entity, an indication of a second allocation for the communications via the second subscriber entity, or an indication of the micro-priorities of the communications via the first subscriber entity and of the communications via the second subscriber entity.

27. The method of claim 25, wherein the micro-priorities of the communications via the first subscriber entity and of the communications via the second subscriber entity comprise:

an indication of a first time period, of an allocation of resources for the communications via the first subscriber entity and of the communications via the second subscriber entity, during which the communications via the first subscriber entity have a priority that is higher than a priority of the communications via the second subscriber entity, and an indication of a second time period, of the allocation of resources for the communications via the first subscriber entity and of the communications via the second subscriber entity, during which the communications via the second subscriber entity have a priority that is higher than a priority of the communications via the first subscriber entity.

28. The method of claim 23, wherein the coexistence management configuration comprises application of one or more of:

transmit off programming, transmit backoff, low noise amplifier protection via transmit backoff, or low noise amplifier protection via reception power control.

29. The method of claim 23, wherein the one or more parameters comprise one or more dual subscriber coexistence metrics, and wherein one or more of the one or more dual subscriber coexistence metrics comprise one or more of:

whether communications via a first allocation associated with the first subscriber entity are harmonics with communications via a second allocation associated with the second subscriber entity, whether intermodulation of communications via the first allocation or communications via the second allocation cause desensing associated with the first subscriber entity or the second subscriber entity, whether transmitting uplink communications via one of the first allocation or the second allocation causes receive blocking for another of the second allocation or the first allocation, or whether transmitting uplink communications via one of the first allocation associated with the first subscriber entity causes low noise amplifier damage at the UE.

30. The method of claim 23, wherein the dual subscriber operation of the UE comprises a dual-subscriber-dual-active operation.

* * * * *